United States Patent
Sweeney et al.

(10) Patent No.: US 7,848,014 B2
(45) Date of Patent: Dec. 7, 2010

(54) ERBIUM AND ERBIUM/YTTERBIUM CLADDING PUMPED HYBRID OPTICAL AMPLIFIER

(75) Inventors: Kevin L. Sweeney, Naperville, IL (US); Michael R. Keur, Glenview, IL (US); Timothy Hart, Southhampton (GB); Peter Maton, Southhampton (GB)

(73) Assignee: Cisco Technology, Inc., San Jose, CA (US)

( * ) Notice: Subject to any disclaimer, the term of this patent is extended or adjusted under 35 U.S.C. 154(b) by 273 days.

(21) Appl. No.: 12/099,965

(22) Filed: Apr. 9, 2008

(65) Prior Publication Data
US 2009/0257116 A1   Oct. 15, 2009

(51) Int. Cl.
   H04B 10/17   (2006.01)
   H04B 10/12   (2006.01)
(52) U.S. Cl. ............... 359/337.3; 359/341.3; 359/341.5
(58) Field of Classification Search ............. 359/337.3, 359/341.3, 341.5
   See application file for complete search history.

(56) References Cited

U.S. PATENT DOCUMENTS

| | | | |
|---|---|---|---|
| 4,815,079 A | | 3/1989 | Snitzer et al. |
| 5,087,108 A | | 2/1992 | Grasso et al. |
| 5,530,710 A | | 6/1996 | Grubb |
| 5,532,870 A | * | 7/1996 | Shigematsu et al. ....... 359/337.4 |
| 5,731,892 A | * | 3/1998 | DiGiovanni et al. ..... 359/337.4 |
| 5,790,722 A | * | 8/1998 | Minden et al. ................. 385/27 |
| 5,930,030 A | * | 7/1999 | Scifres ..................... 359/341.3 |
| 5,937,134 A | * | 8/1999 | DiGiovanni ................. 385/142 |
| 6,411,762 B1 | | 6/2002 | Anthon et al. |
| 6,487,006 B1 | * | 11/2002 | Chen ....................... 359/341.32 |
| 6,583,925 B1 | * | 6/2003 | Delavaux et al. ........ 359/341.32 |
| 2001/0022884 A1 | | 9/2001 | Bayart et al. |
| 2002/0012163 A1 | | 1/2002 | Zanoni et al. |
| 2002/0085803 A1 | * | 7/2002 | Zarris et al. .................... 385/24 |
| 2002/0159736 A1 | | 10/2002 | Dejneka et al. |

(Continued)

OTHER PUBLICATIONS

International Search Report—3 pgs., May 12, 2009, Cisco Technology, Inc.

(Continued)

*Primary Examiner*—Eric Bolda
(74) *Attorney, Agent, or Firm*—Tarolli, Sundheim, Covell & Tummino LLP

(57) ABSTRACT

An optical fiber amplifier apparatus and optical signal amplification method are provided. In one example, the amplifier apparatus comprises an optical combiner that is configured to receive an input optical signal to be amplified and a pump light beam. The optical combiner combines for output the input optical signal and the pump light beam. A first cladding pumped optical fiber in which Erbium is the only optically active dopant is coupled to the optical combiner to receive the pump light beam and the input optical signal. The first cladding pumped optical fiber pre-amplifies the input optical signal and passes the pre-amplified input optical signal and power of the pump light beam not absorbed by the first cladding pumped optical fiber. A second cladding pumped optical fiber is provided that is coupled to the first cladding pumped optical fiber. Erbium and Ytterbium are optically active dopants in the second cladding pumped optical fiber. The second cladding pumped optical fiber absorbs power of the pump light beam that was not absorbed by the first cladding pumped optical fiber to further amplify the pre-amplified input optical signal to produce an output amplified optical signal that is a desired amplified version of the input optical signal.

15 Claims, 9 Drawing Sheets

U.S. PATENT DOCUMENTS

2003/0081892 A1*  5/2003  Ghera et al. .................. 385/27
2007/0091948 A1   4/2007  Di Teodoro et al.

OTHER PUBLICATIONS

Written Opinion—5 pgs., May 13, 2009, Cisco Technology, Inc.

Z. G. Lu et al., "A hybrid fiber amplifier with 36.9-dBm output power and 70-dB gain," Photonic Systems, Institute for Microstructural Sciences, National Research Council, M-50, 1200 Montreal Road, Rm. 303, Ottawa, ON, Canada K1A 0R6, Optics Communications 256 (2005) 352 357, published by Elsevier B.V.

P. Bousselet et al., "+ 30 dBm output power from a cladding-pumped Yb-free EDFA for L band applications," Alcatel Research & Innovation, Marcoussis, France, Copyright 2001 Optical Society of America.

P. Bousselet et al., "+33 dBm output power from a full C-band cladding diode-pumped EDFA," Alcatel Research & Innovation, Marcoussis, France.

J. A Minelly et al., "Yb-free high energy double-clad Er fiber amplifier," OAA 2004, Post-deadline session, Jun. 29th, San Francisco, CA.

* cited by examiner

ERBIUM AND ERBIUM/YTTERBIUM CLADDING PUMPED HYBRID OPTICAL AMPLIFIER

BACKGROUND

The present invention relates to amplification of optical signals.

Erbium/Ytterbium (Er/Yb) cladding pumped optical amplifiers are capable of producing amplifiers with high output powers. It is difficult to make an efficient Erbium (Er) only cladding amplifier because of the low pump absorption of Erbium as compared to the high pump absorption of Er/Yb. Erbium-only single mode amplifiers have extremely good low noise properties and can operate at low input powers. For a low noise, high output power amplifier, a common strategy is to construct a hybrid amplifier consisting of a single mode Er pre-amplifier followed by a high power Er/Yb co-doped amplifier. This type of combination has both the low noise properties of Er amplifiers and the high output power capabilities of Er/Yb amplifiers. However, this dual amplifier requires a single mode pump laser for the Er pre-amp and a separate high power pump laser for the high power post amplifier. It also requires two wavelength division multiplexers for combining the two pump lasers into the amplifier. As a result, this optical amplifier design is expensive.

It is desired to provide a lower cost optical amplifier that has many of the good low noise properties of an Er single mode amplifier and the high output power properties of Er/Yb amplifiers.

DETAILED DESCRIPTION

Overview

An optical fiber amplifier apparatus and optical signal amplification method are provided. In one example, the amplifier apparatus comprises an optical combiner that is configured to receive an input optical signal to be amplified and a pump light beam. The optical combiner combines for output the input optical signal and the pump light beam. A first cladding pumped optical fiber is provided comprising a single mode core in which Erbium (Er) (and not Ytterbium (Yb), for example) is the only optically active dopant. The first cladding pumped optical fiber is coupled to the optical combiner to receive the pump light beam and the input optical signal. The first cladding pumped optical fiber pre-amplifies the input optical signal and passes the pre-amplified input optical signal and unabsorbed power of the pump light beam. A second cladding pumped optical fiber is provided that is coupled to the first cladding pumped optical fiber. The second cladding pumped optical fiber comprises a single mode core in which Er and Yb are optically active dopants. The second cladding pumped optical fiber absorbs power of the pump light beam that was not absorbed by the first cladding pumped optical fiber to further amplify the pre-amplified input optical signal to produce an output amplified optical signal that is a desired amplified version of the input optical signal.

The term "cladding pumped optical fiber" used herein is meant to refer to an optical fiber that comprises a single mode core, a first (inner) cladding region and a second (outer) cladding region. The single mode core guides the optical signal of interest that is to be amplified and the first cladding region serves as a multimode core or waveguide that carries/guides the pump light beam. An example of a cross-section of a cladding pumped optical fiber is described hereinafter in conjunction with FIG. 3. Another term for a "cladding pumped optical fiber" used in the art is a "singe mode double clad optical fiber."

The term "optically active dopant" is meant to refer to those Rare Earth Elements, such as Er and Yb, which are used in optical fibers for purposes of amplifying an optical signal, and is not meant to include or refer to other dopants used in optical fibers for structural or other purposes. Thus, the term "Er-only" doped cladding pumped optical fiber refers to a cladding pumped optical fiber in which the only optically active dopant in the single mode core is Er (and not Yb, for example). Similarly, the terms "Er/Yb co-doped" or "Er/Yb-doped" cladding pumped optical fiber refers to a cladding pumped optical fiber in which both Er and Yb are optically active dopants in the single mode core.

Figure 1:
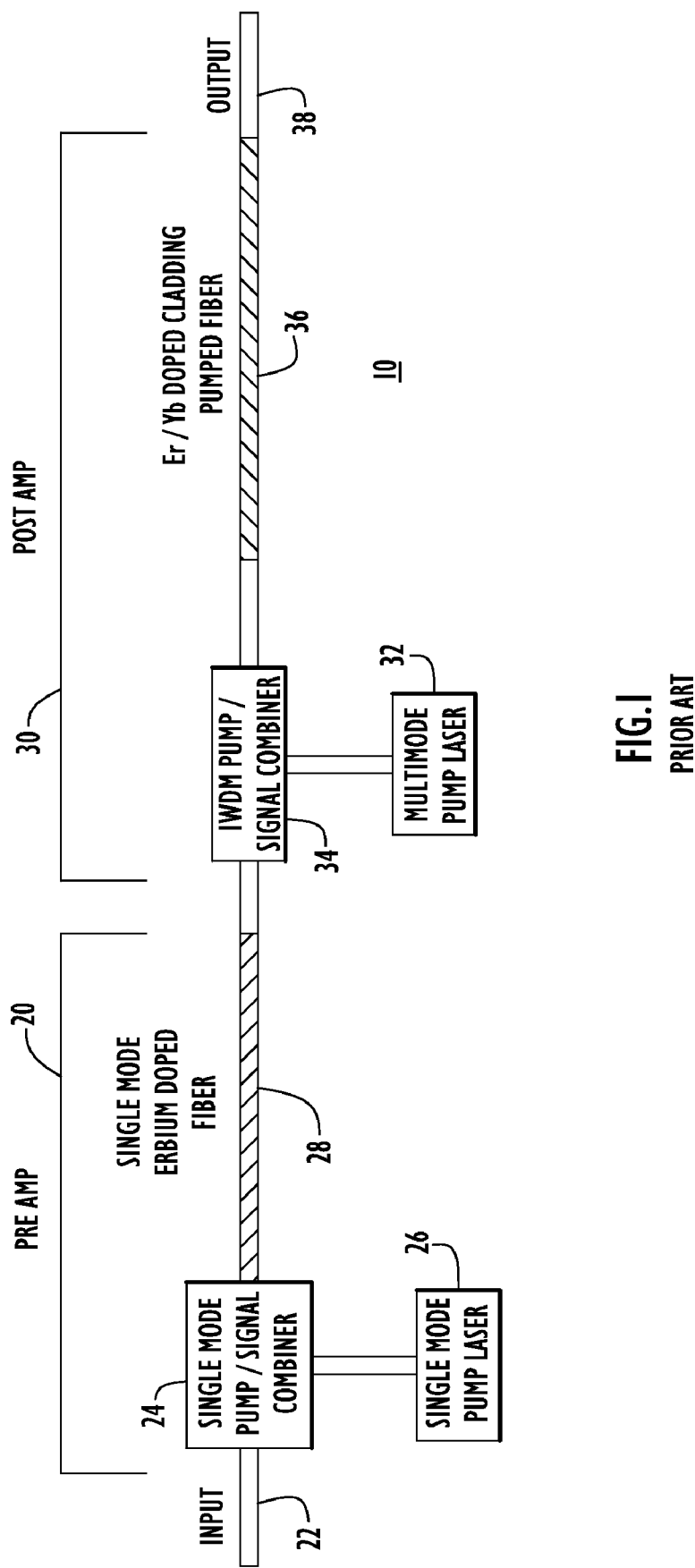
FIG. 1 is a block diagram of a conventional optical amplifier apparatus.

Referring first to FIG. 1, a conventional optical amplifier apparatus is shown at reference numeral 10. The optical amplifier 10 actually comprises two amplifiers connected together, where one amplifier serves as a pre-amplifier stage and the other amplifier serves as a post-amplifier stage.

The pre-amplifier stage is shown at 20 and comprises an input 22 that receives the input optical signal to be amplified. The pre-amplifier stage 20 comprises a single mode pump laser 26, an optical signal combiner 24 and a single mode doped optical fiber 28. As one example, the single mode doped fiber 28 is Er-doped fiber that does not have a multimode core, and for example, has only a single mode core.

The post-amplifier stage is shown at 30 and receives as input the output of the pre-amplifier stage 20. The post-amplifier stage 30 comprises a multimode pump laser 32 and an isolator-wavelength division multiplexer (IWDM) 34 that also acts as an optical combiner to combine the input optical signal to be amplified from the single mode doped optical fiber 28 and the multimode optical pump light beam from the laser 32. The combined optical signal produced by the IWDM 34 is supplied to an Er/Yb doped cladding pumped optical fiber 36, and the output of the cladding pumped optical fiber 36 is essentially the output of the apparatus 10 at the output port 38.

Figure 2:
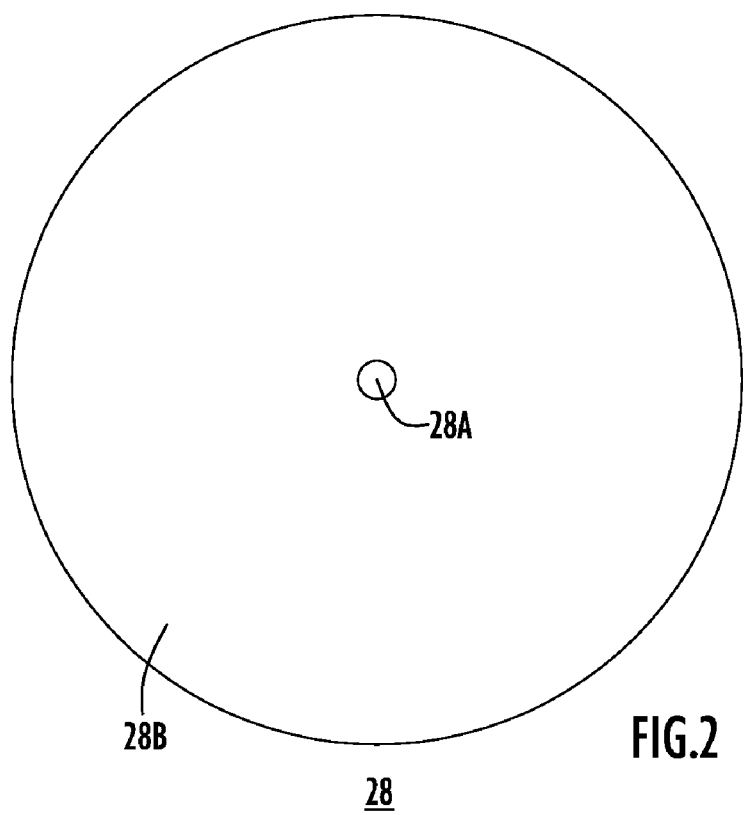
FIG. 2 shows an example of a cross-section of a single mode optical fiber.
Figure 3:
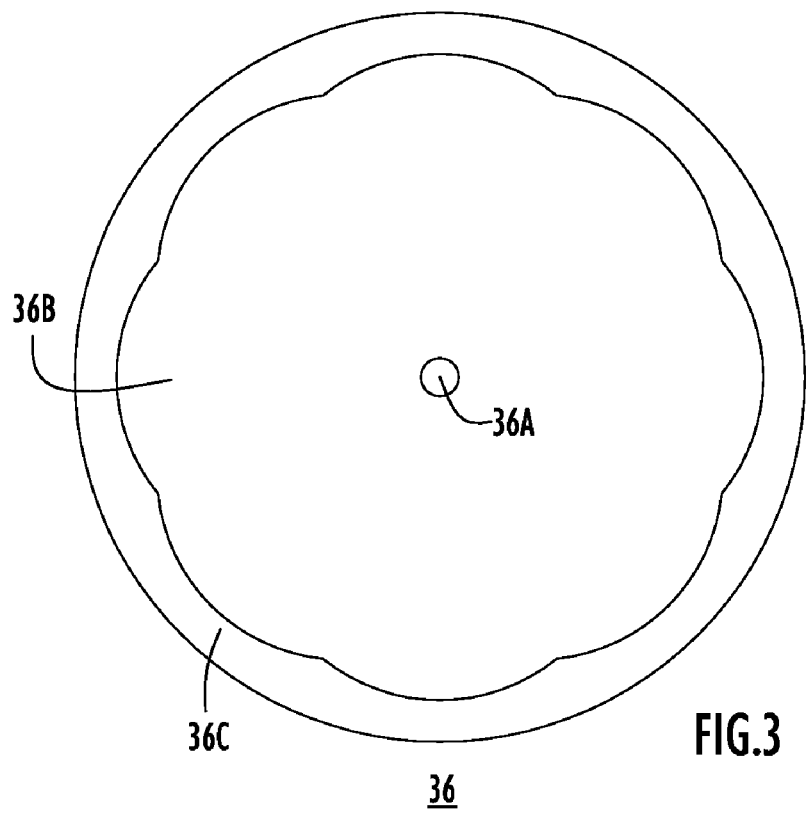
FIG. 3 shows an example of a cross-section of a cladding pumped optical fiber comprising a single mode core for signal power and a multimode core for pump power.

Reference is now made to FIGS. 2 and 3 for a further description of the fibers 28 and 36 used in the apparatus 10. As shown in FIG. 2, the single mode optical fiber 28 comprises a single mode core 28A surrounded by a cladding region 28B. The pre-amplifier stage 20 is a single mode amplifier that provides low noise amplification of the input optical signal but not as much output power as the post-amplifier stage 30. In the single mode amplifier stage 20, the input optical signal to be amplified and the single mode pump light beam are both coupled into the single mode core 28A. Thus, in the single mode optical fiber 28, the single mode core 28A is doped with Er but not Yb and guides both the optical signal and the optical pump beam. For example, the diameter of the single mode core 28A is, in one example, six microns.

As shown in FIG. 3, the cladding pumped optical fiber 36 comprises a single mode core 36A, a first (inner) cladding region 36B and a second (outer) cladding region 36C. In the cladding pumped optical fiber 36, the single mode core 36A is co-doped with Er and Yb and guides the optical signal. The first cladding region 36B serves as a multimode core or waveguide that carries/guides the pump light beam. FIG. 3 shows that the first cladding region 36B is slightly smaller than the outside diameter of the cladding pumped optical fiber 36. The second cladding region 36C merely contains the pump light beam within the first cladding region 36B.

Referring back to FIG. 1, the output of the IWDM 34 goes into the cladding pumped optical fiber 36, but unlike the configuration of the pre-amplifier 20, the multimode pump beam from the multimode pump laser 32 goes into this secondary multimode waveguide 36B (FIG. 3) of the cladding pumped optical fiber 36, which is rather large compared to the single mode core of the fiber 36. Consequently, the Er/Yb doped cladding pumped optical fiber 36 can allow for greater amounts of power in the pump signal than the single mode doped fiber 28. In fact, the pre-amplifier stage 20 and the post-amplifier stage 30 are sold as separate products, and they are ganged together in order to exploit the advantages that each of these products has. That is, the pre-amplifier stage 20 provides low-noise pre-amplification and the post-amplifier stage 30 provides the high power amplification. For example, the pump power of the single mode pump laser 26 is, for example, 0.5 watt and the pump power of the multimode pump laser 32 is, for example, 10 watts. The single mode pump laser 26 in the pre-amplifier stage 20 is much more expensive than the multimode pump laser 32. This is because the single mode pump laser 32 is designed to pump light into a relatively small single mode core, e.g., 6 microns, whereas the multimode pump laser is designed to pump light into a much larger space, e.g., 105 microns.

As is known in the art, a single mode fiber can support one fundamental mode of light, that is, light of one transverse mode. By contrast, a multimode fiber can support more than one transverse mode of light, and typically has many modes. Thus, a single mode fiber core is used in both the pre-amplifier stage 20 and the post-amplifier stage 30 to carry the optical signal to be amplified. In the single mode fiber 28, the core is doped with Erbium as the only optically active dopant and it is the element that performs the amplification of the optical signal. However, the first cladding region of the multimode cladding fiber 36 in the post-amplifier stage 30 carries light of multiple modes and allows light to intersect with the optically active dopants Er and Yb in the single mode core to achieve the desired absorption and thus amplification of the input optical signal. The Yb in the fiber 36 absorbs the pump power and transfers it efficiently to the Er in the single mode core of the fiber 36 that performs the amplification function.

Figure 4:
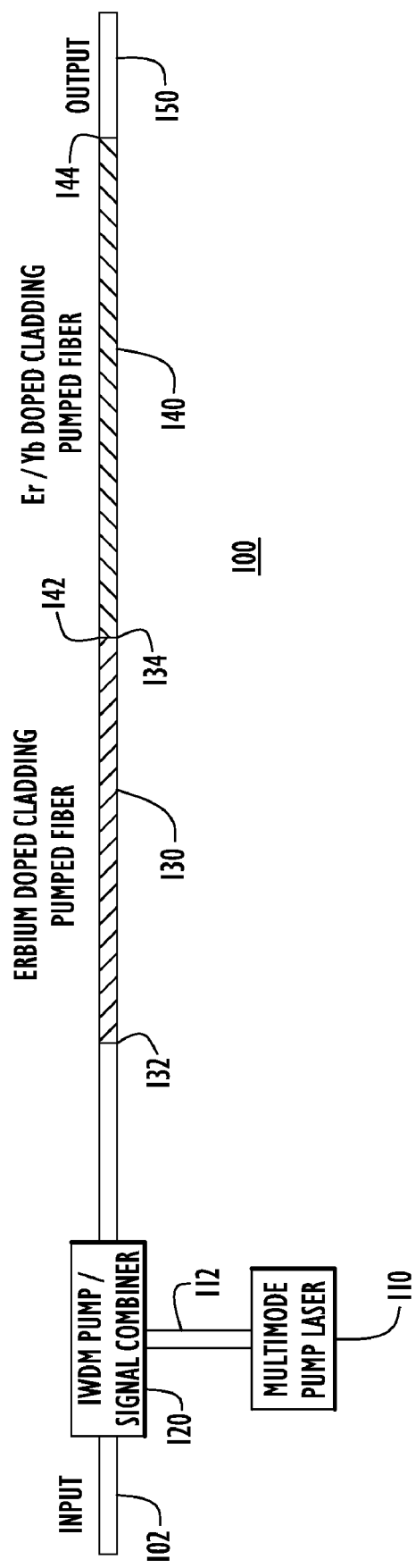
FIG. 4 is an example of a block diagram of a cladding pumped hybrid optical amplifier.

Turning now to FIG. 4, an example of a cladding pumped hybrid optical amplifier is shown at 100. The amplifier 100 is referred to herein as an "all cladding pumped" apparatus because it uses two cladding pumped optical fibers spliced or otherwise coupled together in series. The amplifier 100 need not use a single mode fiber like that shown at 28 in FIGS. 1 and 2. The amplifier 100 comprises an input port 102, a multimode pump laser 110, an IWDM combiner 120, a first cladding pumped optical fiber 130 followed by a second cladding pumped optical fiber 140. Fibers 130 and 140 may have a cross-section similar to that shown in FIG. 3. The output of the amplifier 100 is taken at the output port 150. In one example, the optically active dopant in the first cladding pumped optical fiber 130 is Er only (and not Yb). That is, the single mode core of (36A) of the first cladding pumped optical fiber 130 is doped with only one Rare Earth Element as the optically active dopant, that is Er only. On the other hand, the single mode core (36A) of the second cladding pumped optical fiber 140 is doped with two Rare Earth Elements as optically active dopants, that is with Er and Yb. The multimode pump laser 110 generates a pump light beam that is coupled to the IWDM combiner 120 by an optical fiber 112.

The IWDM combiner 120 has a first input that receives the input optical signal to be amplified from the input port 102 and a second input that receives the multimode pump light beam from the multimode pump laser 110. The first cladding pumped optical fiber 130 has a first end 132 that is connected to an output of the IWDM combiner 120 and a second end 134 that is coupled to a first end 142 of the second cladding pumped optical fiber 140. The second cladding pumped optical fiber 140 has a second end 144 coupled to the output port 150 to which the output amplified optical signal is provided. The amplifier 100 may be said to consist of a pre-amplifier module and a post-amplifier module. The pre-amplifier module or section of amplifier 100 comprises the first cladding pumped optical fiber 130. The post-amplifier module or section comprises the second cladding pumped optical fiber 140.

In one example, the second end 134 of the first cladding pumped optical fiber 130 is fusion spliced (connected) to the first end 142 of the second cladding pumped optical fiber 140. However, it should be understood that the fibers 130 and 140 may be optically connected by other means, such as the use of standard optical connectors. To this end, the amplifier 100 may be built from multiple modules or sections, each of which has the relevant components such that when assembled, an amplifier configuration is created that at least contains a multimode pump laser, a IWDM combiner, a first cladding pumped optical fiber with low output power but low noise properties followed by a second cladding pumped optical fiber with higher output power properties.

In one example of the amplifier 100, only a single pump, e.g., multimode pump laser 110, may be used and furthermore the multimode pump laser 110 is much less expensive than the single mode pump laser (shown at 26 in FIG. 1). As a result, in one form only one optical combiner is needed in the amplifier 100. The pump power of the multimode pump laser 110 is only partially absorbed in the first cladding pumped optical fiber 130 but the first cladding pumped optical fiber 130 has desirable low noise and low input power properties since Er is the only Rare Earth Element that serves as the optically active dopant in the single mode core of fiber 130. Thus, the first cladding pumped optical 130 serves well as a pre-amplifier. On the other hand, the second cladding pumped optical fiber 140 has much higher pump power absorption (though maybe higher noise) properties than the first cladding optical fiber 130 because its single mode core is doped with two Rare Earth Elements, Er and Yb, as the optically active dopants. Therefore, the pump power that does not get absorbed in the first cladding pumped optical fiber 130 gets absorbed in the second cladding pumped optical fiber 140, but only after the optical signal has been pre-amplified with the low noise properties of the first cladding pumped optical fiber 130.

Another difference between the amplifier 100 shown in FIG. 4 and the conventional amplifier 10 shown in FIG. 1 is that the first cladding pumped optical fiber 130 in amplifier 100 comprises a multimode cladding region that serves to guide the pump light beam, whereas the first doped fiber 28 in amplifier 10 is a single mode doped fiber that does not have a multimode cladding for transmitting the pump light beam down the fiber. Thus, fibers 130 and 140 in the amplifier 100 are both cladding pumped optical fibers that have a single mode core and a multimode cladding waveguide region. In addition, the multimode pump laser 110 supplies the pump light beam into the optical fiber 112, where the fiber 112 comprises a multimode waveguide region whose diameter is approximately 105 microns, a dimension established by manufacturers of the multimode pump laser 110. Thus, in order to capture as much of the multimode pump light beam power, the diameters of the multimode waveguides in the cladding pumped optical fibers 130 and 140 of amplifier 100 are substantially the same as the diameter of the waveguide of fiber 112. For example, the outer diameter of the first cladding region (multimode core or waveguide region) of fibers 130 and 140 is approximately 105 microns. It would not be possible to use a single mode Er only doped fiber (shown at 28 in FIG. 1) in place of the cladding pumped optical fiber 130 of amplifier 100 because the single mode Er-only doped fiber 28 has a single waveguide whose dimension is, for example, 6 microns; the majority of the pump power would be lost in such a single mode fiber. Thus, the use of 105 micron multimode diameter waveguides for the pump power propagation in the cladding pumped optical fibers 130 and 140 contributes to overall performance of the amplifier 100, as well as making the amplifier simpler to manufacture. Furthermore, in one example, the first cladding pumped optical fiber 130 is approximately 1.5 meters in length and the second cladding pumped optical fiber 140 is approximately 8 meters. By comparison, the single mode fiber 28 in the amplifier 10 is 10 meters long.

Figure 5:
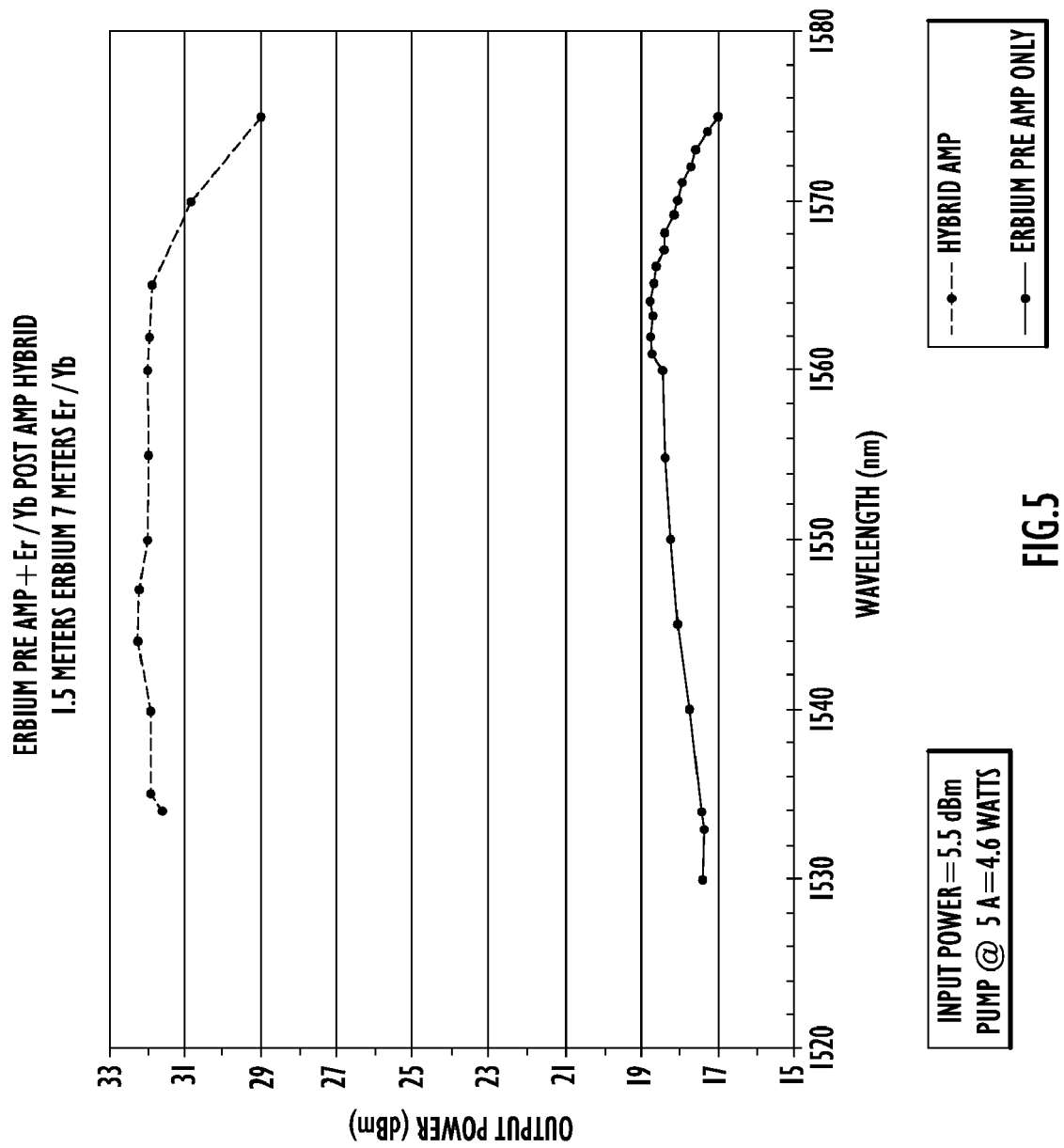
FIG. 5 shows examples of plots of the output power of the cladding pumped hybrid optical amplifier and the output power of the Erbium only cladding pumped optical fiber first stage.

The performance of the amplifier 100 relies on the low noise and low input power (but low output power) amplification of the first cladding pumped optical fiber 130 followed by the high output power of the second cladding pumped optical fiber 140. Reference is now made to FIG. 5 with continued reference to FIG. 4. FIG. 5 shows a plot at reference numeral 200 that represents the output power performance of an amplifier comprising only the Er-only doped cladding pumped fiber 130 to be contrasted against the plot 210 that illustrates the performance of the amplifier 100 comprising the Er-only cladding pumped optical fiber 130 and the Er/Yb co-doped cladding pumped optical fiber 140. Use of the Er-only doped cladding pumped optical fiber 130 alone would not provide sufficient output power and use of the Er/Yb co-doped cladding pumped optical cladding fiber 140 alone would provide too much noise. However, the combination of the two fibers 130 and 140 in series achieves excellent performance, and is in fact, nearly the same performance as the amplifier 10 shown in FIG. 1, but the amplifier 100 does not require a much more expensive single mode pump laser and an additional combiner.

In one form, the optical amplifier described herein is an all cladding pumped hybrid amplifier that can use one multimode pump laser and one optical combiner. The first (e.g., Er-only doped) cladding pumped optical fiber 130 has a multimode waveguide core (e.g., 100 microns in diameter) that exhibits low absorption of the pump power. For example, the first cladding pumped optical fiber 130 may absorb approximately three percent of the pump power. The first cladding pumped optical fiber 130 therefore will have a lot of unabsorbed pump power that would normally be wasted. However, the pump power that is not absorbed in the first cladding pumped optical fiber 130 is absorbed by the second cladding pumped optical fiber 140 that follows the first cladding pumped optical fiber 130. This unique combination of forward pumping an Er-only doped pre-amp cladding pumped optical fiber and an Er/Yb-doped post amp cladding pumped optical fiber with one pump laser and one optical combiner uses the available pump power very efficiently and results in a low cost amplifier with good optical properties.

The amplifier 100 may be best used in a co-propagating mode in which the optical signal and optical pump signal from the pump laser are launched in the same direction through the amplifier 100.

Figure 6:
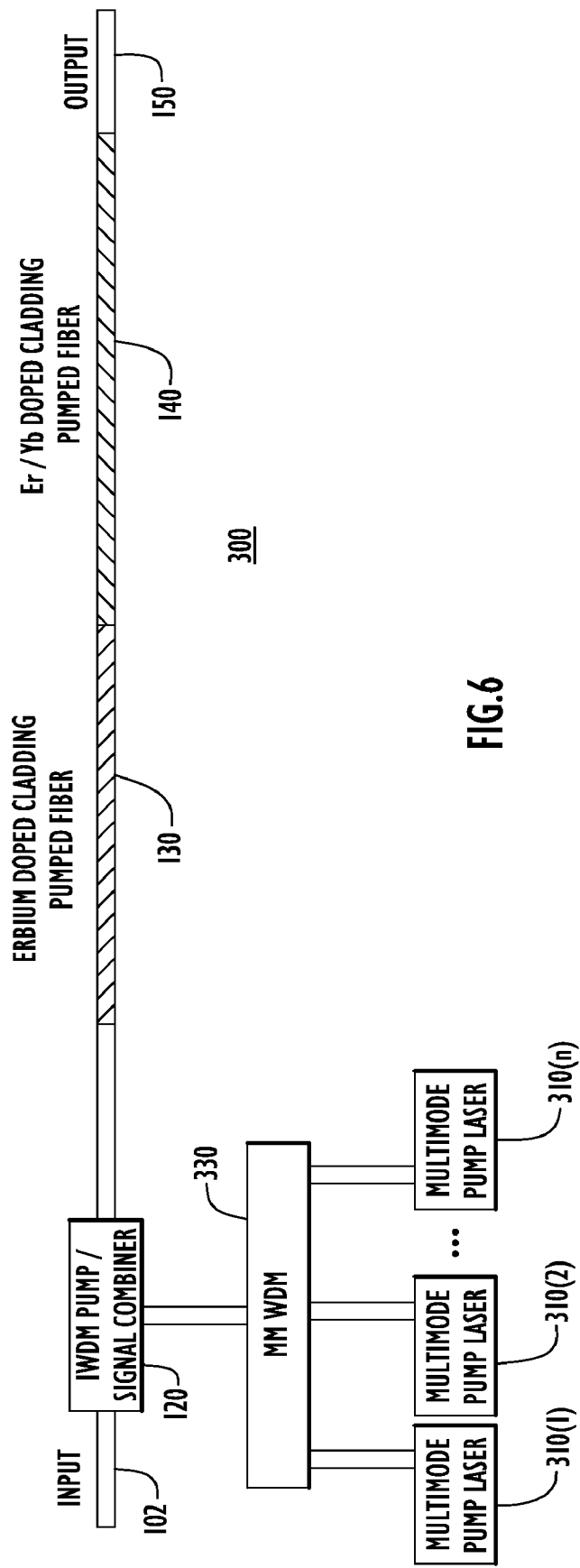
FIG. 6 is another example of a block diagram of a cladding pumped hybrid optical amplifier.

FIG. 6 illustrates an example of a variation to the amplifier 100, and more specifically a configuration to increase the power of the amplifier 100. The amplifier 300 is similar to amplifier 100 of FIG. 2, except that the amplifier of FIG. 6 has two or more multimode pump lasers 310(1), 310(2), . . . , 310(n), and a multimode (MM) WDM combiner 330. The MM WDM 330 combines the pump beams of the lasers 310(1)-310(n) into a single pump beam that is supplied to the IWDM combiner 120 for combining with the input optical signal to be amplified. The remaining downstream components of the amplifier 300 are the same as the amplifier 100 of FIG. 2. In the amplifier 300 of FIG. 6, the output power of the amplifier 300 is increased depending on the number of pump lasers used. The output power approximately doubles if two pump lasers are used, triples if three pump lasers are used, etc. In one example, each of the multimode pump lasers 310(1)-310(n) may be capable of producing a multimode pump light beam at a different wavelength, where at least one of the pump lasers 310(1) to 310(n) produces a beam at 980 nm needed for the Er-only doped cladding pumped optical fiber 130. The Er-only doped cladding pumped optical fiber 130 requires a pump laser with output near 980 nm in order to invert the Er so that it can properly amplify the input signal. The Er/Yb-doped cladding pumped optical fiber 140 can efficiently use either 940 nm or 980 nm pump wavelengths. For example, the multimode pump laser 310(1) produces a pump light beam at a first wavelength (e.g., 980 nm), the multimode pump laser 310(2) produces a pump light beam at a second wavelength, (e.g., 940 nm), and so on. There are numerous optical combiners available on the market that may be used for the function of the MM WDM 330.

In another example, the multimode pump lasers 310(1)-310(n) need not be configured or selected to produce pump light beams at different wavelengths. For example, there is a fused coupler known in the art that can combine from two to six laser pump beams at the same wavelength. Therefore, in another example, the plurality of multimode pump lasers 310(1)-310(n) may produce pump light beams at the same wavelengths.

Figure 7:
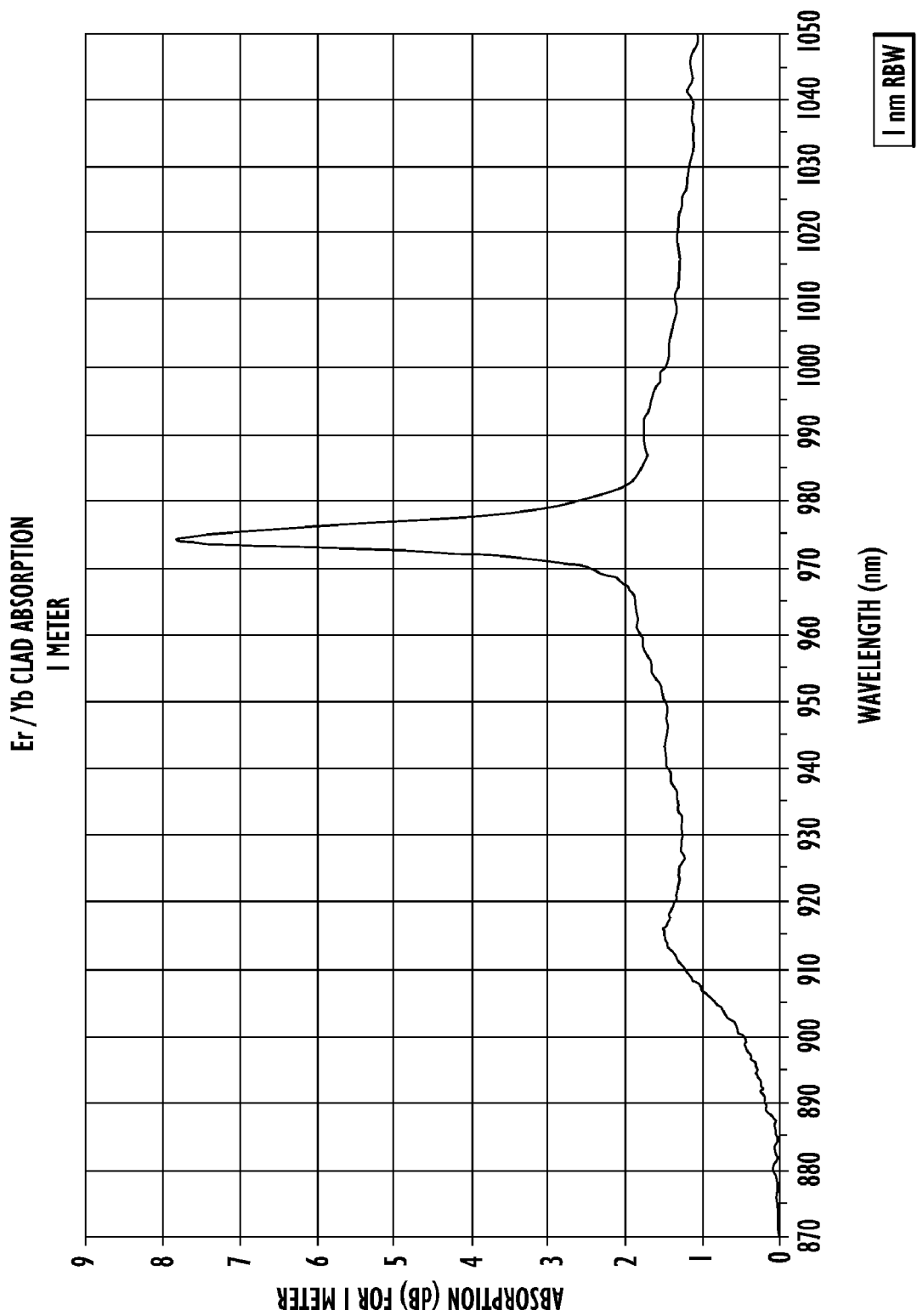
FIG. 7 is an example of a plot showing absorption characteristics for an Er/Yb-doped cladding pumped optical fiber.
Figure 8:
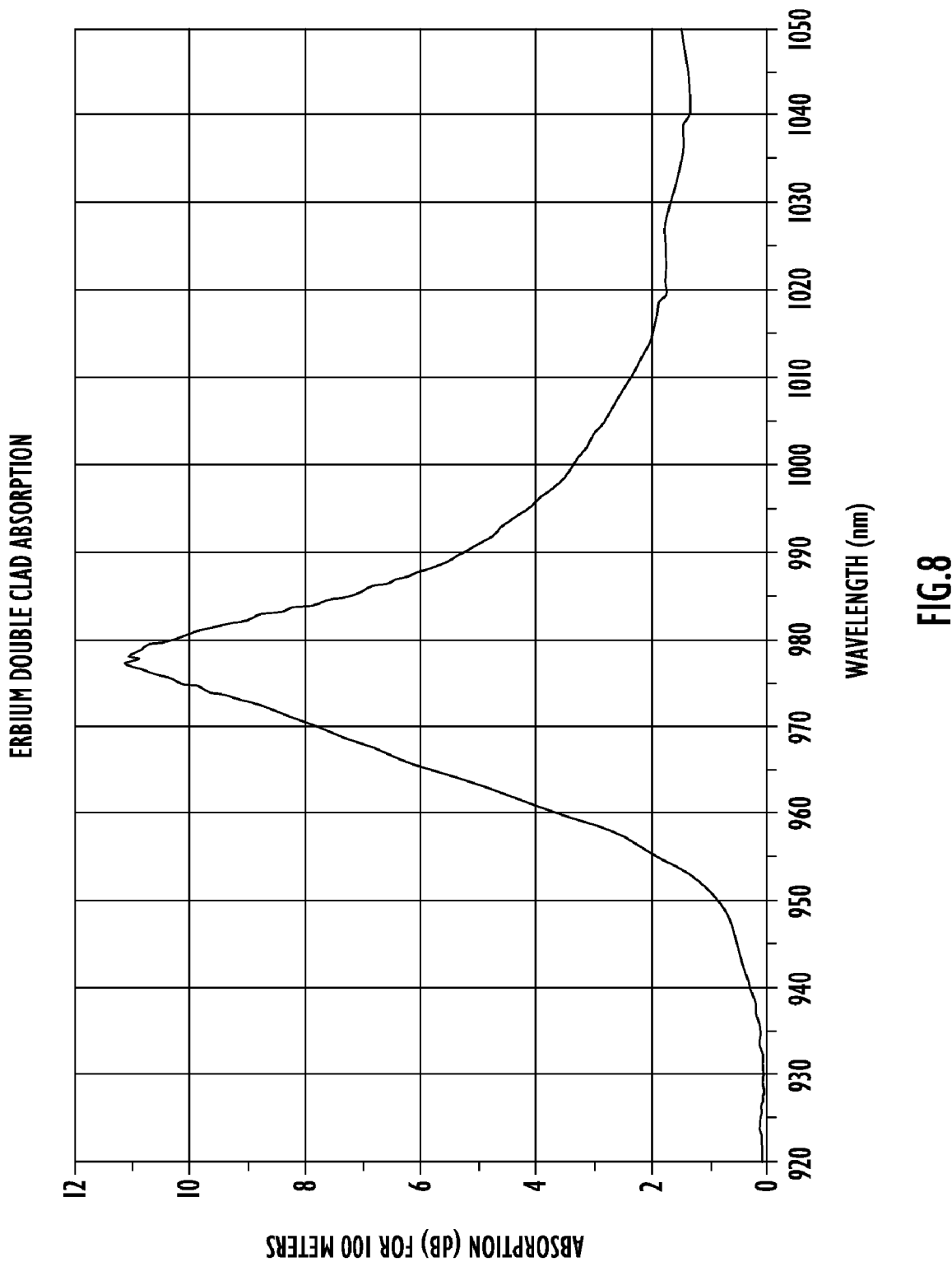
FIG. 8 is an example of a plot showing absorption characteristics for an Er-only doped cladding pumped optical fiber.

FIG. 7 illustrates an example of a plot that shows the absorption for an Er/Yb-doped cladding pumped optical fiber 140 and FIG. 6 illustrates an example of a plot that shows the absorption for an Er-only doped cladding pumped optical fiber 130. The Er/Yb-doped cladding pumped optical fiber 140 absorbs pump power over a large wavelength range. Even on the low wavelength shoulder near 940 nm there is sufficient absorption. The Er-only doped cladding pumped fiber 130 needs a pump laser that is much closer to the peak absorption of 976 nm in one example. Thus, one fiber configuration allows for use of a 940 nm pump laser (e.g., pump laser 310(1)) and a 980 pump laser (e.g., 310(2)).

Figure 9:
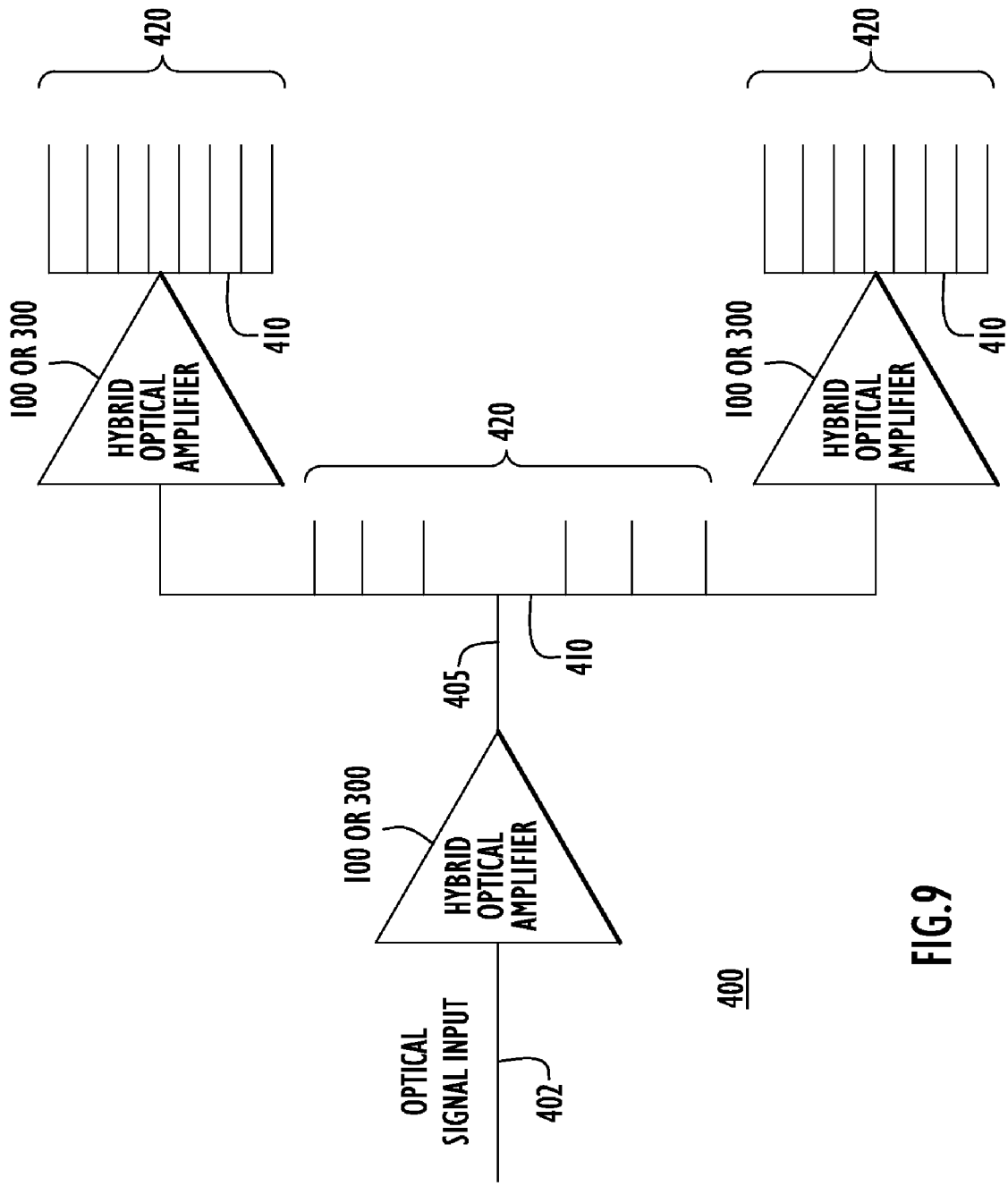
FIG. 9 is a block diagram illustrating examples of deployment options of the cladding pump hybrid optical amplifier in an optical communications network.

Reference is now made to FIG. 9 that illustrates an example of how the amplifier 100 or 300 may be deployed in an optical data distribution network shown at reference numeral 400. The source optical signal to be distributed is at 402 and may originate at a control facility or head-end. There is one instance of the optical amplifier 100 or 300 at the control facility location in the network 400 and the output amplified optical signal is coupled to an optical fiber 405 that extends over a desired distance. The amplified output optical signal of this first instance of the optical amplifier 100 or 300 on fiber 405 is then split by a splitter 410 into multiple branches shown at 420. At each branch 420, another instance of the amplifier 100 or 300 is deployed to boost the signal prior to being again split by a splitter 410 into multiple branches 420 for further distribution.

Figure 10:
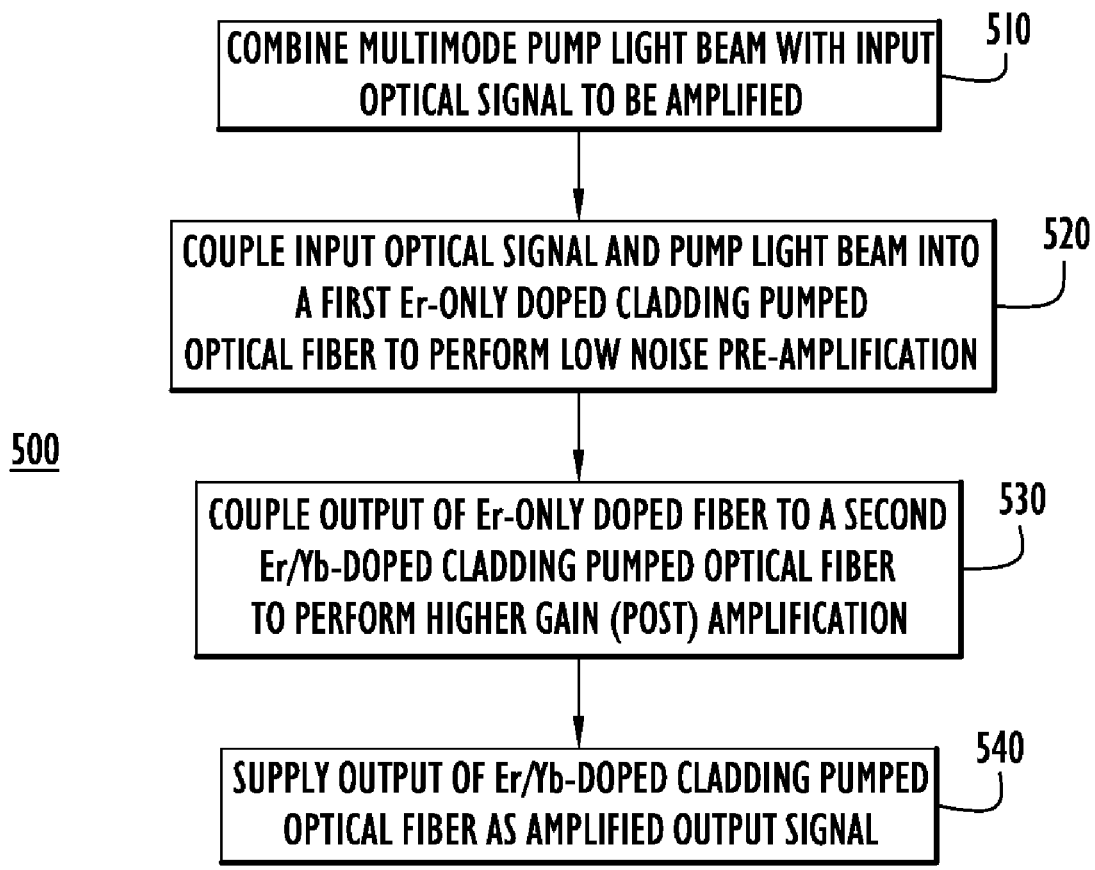
FIG. 10 is an example of a flow chart depicting a method for amplifying an optical signal.

FIG. 10 is a flow chart that illustrates an example of a method 500 for amplifying an optical signal using the techniques described above. At 510, a multimode pump light beam is combined with an input optical signal to be amplified. At 520, the combined pump light beam and input optical signal produced at 510 are coupled into a first Er-only doped cladding pumped optical fiber that serves as a low noise preamplifier due to the properties of the Er-only cladding pumped optical fiber described above in connection with FIG. 4. At 520, power of the pump light beam not absorbed by the Er-only cladding pumped optical fiber is passed out through the end of the fiber. At 530, the pre-amplified input optical signal and the remaining pump power (not absorbed by the Er-only cladding pumped optical fiber) is coupled into a second Er/Yb-doped cladding pumped optical fiber that serves as a higher output power amplifier due to absorption properties of the Er/Yb-doped cladding pumped optical fiber. At 530, the pre-amplified input optical signal is further amplified (post-amplified) to a higher output power. At 540, the optical signal output by the Er/Yb-doped cladding pumped optical fiber is supplied as the output amplified optical signal.

Described above are example embodiments. The concepts described herein may be embodied in other specific forms without departing from the spirit or essential characteristics thereof. The foregoing embodiments are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. An apparatus comprising:
a first optical combiner that is configured to receive an input optical signal to be amplified and a pump light beam, wherein the first optical combiner is configured to combine for output the input optical signal and the pump light beam;
a first cladding pumped optical fiber having a first end and a second end, the first end configured to couple to the output of the first optical combiner, wherein the only optically active dopant in the first cladding pumped optical fiber is Erbium only and the first cladding pumped optical fiber outputs at the second end a first amplified optical signal together with power of the pump light beam not absorbed by the first cladding pumped optical fiber; and
a second cladding pumped optical fiber having a first end and a second end, the first end configured to be coupled to the second end of the first cladding pumped optical fiber, wherein Erbium and Ytterbium are the optically active dopants in the second cladding pumped optical fiber and the second cladding pumped optical fiber absorbs power of the pump light beam not absorbed by the first cladding pumped optical fiber to further amplify the first amplified signal and produce an output amplified optical signal that is a desired amplified version of the input optical signal.

2. The apparatus of claim 1, wherein each of the first and second cladding pumped optical fibers comprises a multimode waveguide region that has a diameter that is substantially equal to a diameter of an optical fiber that couples the pump light beam to the first optical combiner.

3. The apparatus of claim 1, and further comprising a pump laser that produces the pump light beam, and wherein the pump light beam is a multimode pump light beam.

4. The apparatus of claim 1, and further comprising a plurality of pump lasers each of which outputs a multimode pump light beam, and a second optical combiner that combines the plurality of multimode pump light beams to produce the pump light beam that is coupled to the first optical combiner.

5. The apparatus of claim 4, wherein each of the plurality of pump lasers outputs a corresponding multimode pump light beam at a different wavelength.

6. An apparatus comprising:
a first optical combiner that is configured to receive an input optical signal to be amplified and a multimode pump light beam, and wherein the first combiner is configured to combine for output the input optical signal and the multimode pump light beam;
a first cladding pumped optical fiber having a first end and a second end, the first end configured to couple to the output of the first optical combiner, wherein Erbium is the only optically active dopant in the first cladding pumped optical fiber and the first cladding pumped optical fiber pre-amplifies the input optical signal and outputs at the second end a pre-amplified optical signal and power of the multimode pump light beam that is not absorbed by the first cladding pumped optical fiber;
a second cladding pumped optical fiber having a first end and a second end, wherein the first end of the second cladding pumped optical fiber is configured to be spliced to the second end of the first cladding pumped optical fiber, wherein Erbium and Ytterbium are optically active dopants in the second cladding pumped optical fiber and the second cladding pumped optical fiber absorbs power of the multimode pump light beam not absorbed by the first cladding pumped optical fiber and further amplifies the pre-amplified optical signal to produce an output amplified optical signal that is a desired amplified version of the input optical signal.

7. The apparatus of claim 6, wherein each of the first and second cladding pumped optical fibers comprise a multimode waveguide region that has a diameter that is substantially equal to a diameter of an optical fiber that couples the optical pump signal from the first pump laser to the first optical combiner.

8. The apparatus of claim 6, and further comprising a multimode pump laser that produces the multimode pump light beam that is coupled to the first optical combiner.

9. The apparatus of claim 6, and further comprising a plurality of multimode pump lasers each of which outputs a multimode pump light beam, and a second optical combiner that combines the plurality of pump light beams to produce the pump light beam that is coupled to the first optical combiner.

10. The apparatus of claim 9, wherein each of the plurality of multimode pump lasers outputs a corresponding multimode pump light beam at a different wavelength.

11. A method comprising:
combining a plurality of multimode pump light beams to produce a combined pump light beam;
optically combining an input optical signal to be amplified and the combined pump light beam and coupling the same into a first cladding pumped optical fiber in which Erbium is the only optically active dopant such that the first cladding pumped optical fiber pre-amplifies the input optical signal and outputs power of the combined pump light beam not absorbed by the first cladding pumped optical fiber and a pre-amplified optical signal;
post-amplifying the pre-amplified optical signal with a second cladding pumped optical fiber that in which Erbium and Ytterbium are optically activate dopants such that the second cladding pumped optical fiber absorbs power of the combined pump light beam not absorbed by the first cladding pumped optical fiber to further amplify the pre-amplified optical signal and produce an output amplified optical signal that is a desired amplified version of the input optical signal.

12. The method of claim 11, wherein the combined pump light beam is a multimode pump light beam.

13. The method of claim 11, wherein each of the plurality of multimode pump light beams is at a different wavelength.

14. An apparatus comprising:
an optical combiner that is configured to receive an input optical signal to be amplified and a combined pump light beam;
a plurality of pump lasers that output a respective plurality of multimode pump light beams, the plurality of multimode pump light beams having separate and distinct wavelengths;
a second optical combiner that combines the plurality of multimode pump light beams to produce the combined pump light beam;
a first cladding pumped optical fiber doped in which Erbium is the only optically active dopant that is coupled to the optical combiner to receive the combined pump light beam and the input optical signal, wherein the first cladding pumped optical fiber pre-amplifies the input optical signal and passes the pre-amplified input optical signal and power of the combined pump light beam not absorbed by the first cladding pumped optical fiber; and
a second cladding pumped optical fiber that is coupled to an end of the first cladding pumped optical fiber, wherein Erbium and Ytterbium are optically active dopants in the second cladding pumped optical fiber so that the second cladding pumped optical fiber absorbs power of the combined pump light beam that was not absorbed by the first cladding pumped optical fiber to further amplify the pre-amplified input optical signal in order to produce an output amplified optical signal that is a desired amplified version of the input optical signal.

15. The apparatus of claim 14, wherein each of the first and second cladding pumped optical fibers comprises a multimode waveguide region that has a diameter that is substantially equal to a diameter of an optical fiber that couples the combined pump light beam to the first optical combiner.

* * * * *